United States Patent Office 3,416,939
Patented Dec. 17, 1968

3,416,939
ALKALI-METAL SILICATE PROTECTIVE COATING
John B. Schutt, Silver Spring, and Charles M. Shai, Gambrills, Md., assignors to the United States of America as represented by the Administrator of the National Aeronautics and Space Administration
No Drawing. Filed May 3, 1965, Ser. No. 452,944
10 Claims. (Cl. 106—84)

ABSTRACT OF THE DISCLOSURE

An inorganic paint composition and method for processing same has been developed in which the composition is particularly resistant to ultra violet radiation and wherein the constituents include an alkali-metal silicate solution vehicle and aluminum oxide of particle size of 0.3 to 2.0 microns as a pigment and filler. The applicability of the paint is enhanced by the addition of potassium hydroxide to increase its flexibility and boric acid and/or zinc oxide to increase its hardness. The paint is formed by merely stirring the resulting mixture for a time depending on the quality desired of the paint. In addition, the time of processing can be shortened by the application of heat.

---

The invention described herein may be manufactured and used by and for the Government of the United States of America for governmental purposes without the payment of any royalties thereon or therefor.

INTRODUCTION

The present invention relates to a new inorganic protective coating and method for producing same, and more particularly, to the composition and method of producing a durable, fireproof protective coating having excellent resistance to ultra-violet radiation and having good shelf life.

Satellites and other space vehicles, due to environmental conditions existing in outer space, are coated to provide temperature control, solar pressure control, etc. In particular, a paint for such use, by necessity, must exhibit high resistance to cracking, peeling and flaking when subjected to a wide range of temperature and vacuum variations and ultra-violet radiation.

Since organic paints or paints having organic constituents are not generally applicable as coatings for space vehicles, inasmuch as they are not sufficiently resistant to ultra-violet radiation and particle bombardment, nor are they fireproof, various inorganic paints have been experimented with, hopefully, to provide a coating that will meet the rigorous and exacting requirements needed for a paint to be used for the protection of the exterior of space vehicles. So far, the inorganic paints, including alkali-metal silicate paints, that have been used to coat space vehicles have not proven entirely satisfactory since they have had poor adhesion properties, spreadability characteristics, and/or sealing qualities (limited amount of filler material generated). In an attempt to make these paints adaptable to the various space uses and so that they might more properly adhere to the space vehicles, the surfaces to be coated had to be abraded by sand blasting, sand paper or the like. Carrying out this abrading operation resulted in an increased expense by requiring more labor and time. In addition, in many instances abrading turned out to be unsuitable as it often created pits, scratches and other blemishes in the substrate that would have to be covered or sized.

Accordingly, it is an object of the present invention to provide an inexpensive, non-toxic, alkali-metal silicate paint that has excellent ultra-violet radiation resistance and at the same time can be simply applied to various surfaces.

It is another object of the present invention to provide an optically reproducible alkali-metal silicate paint capable of being coated on a substrate to a thickness in the order of approximately 4 to 22 mils and having a property of facilitating ease of cleaning.

It is still another object of the present invention to provide an alkali-metal silicate paint having a good adhesive characteristic and being resistant to marring, cracking, chalking and oxidation.

It is an additional object of the present invention to provide a method for forming an alkali-metal silicate paint having the qualities recited in the previously mentioned objects as well as possessing good shelf life.

These and other objects are attained by the present invention which is a novel inorganic paint composition comprising an alkali-metal silicate, such as potassium silicate ($K_2SiO_3 \cdot nH_2O$), which is a dispersing medium (vehicle); and aluminum oxide ($Al_2O_3 \cdot nH_2O$), which behaves as both a pigment and filler. The aluminum oxide also increases the flexibility of the paint, as applied to a substrate material, particularly, when the paint includes potassium hydroxide as a separate ingredient. Should it be desirable to increase the hardness (resistance to marring) of the paint, boric acid ($H_3BO_3$) and/or zinc oxide (ZnO) can be added to the composition. The invention further includes the process of forming the paint composition itself, by the aluminum oxide and the alkali-metal silicate, e.g., potassium silicate, as a water solution, being thoroughly mixed in a container for a length of time dependent upon the particle size of the aluminum oxide and the surface texture the coating is to have. The specific quantities of the various constituents used in the process are defined more specifically hereinbelow.

DESCRIPTION OF THE INVENTION

Generally, the basic paint composition comprises an alkali-metal silicate, such as potassium silicate in a water solution and powdered aluminum oxide of small particle size (in the order of 0.3 to 2.0 microns). With these two ingredients, a durable, water resistant, ultra-violet radiation resistant, optically reproducible white paint is obtained. Sample I is such a paint composition with limits of the ingredients being specified.

Sample I

| Ingredients: | Range (percent by weight) |
|---|---|
| Potassium silicate water solution | 72–90 |
| Aluminum oxide powder (particle size of 0.3 to 2.0 microns) | 10–28 |

Although Sample I indicates that the ingredients can be varied over a fairly wide range and still result in a good paint being produced, it has been found that maximum opacity can be attained when the ratio of aluminum oxide to alkali-metal silicate solution is approximately 1:3.

Examples I and I' are paint compositions within the limits specified in Sample I, wherein the aluminum oxide powder is of particle sizes of 0.3 and 1 micron respectively.

Example I

| Ingredients: | Percent by weight |
|---|---|
| Potassium silicate solution (35 percent solids) | 81.1 |
| Aluminum oxide powder (0.3 micron particle size) | 18.9 |

Example I'

| Ingredients: | Percent by weight |
|---|---|
| Potassium silicate solution (35 percent solids) | 74 |
| Aluminum oxide powder (1 micron particle size) | 26 |

The ingredients listed in either Sample I or Examples I and I' are processed in a manner that will be enumerated, to form a non-yellowing white paint having the characteristics recited above. The powdered aluminum oxide, from 0.3 to 2 microns in particle size, is stirred into the alkali-metal silicate, e.g., potassium silicate, water solution; and the resultant mixture is stirred for 5 to 48 hours, depending upon the surface texture the paint is to have. The processing time can be reduced to between 15 to 45 minutes by the ingredients being simultaneously stirred and heated to between 150 to 220 degrees Fahrenheit. However by accelerating the process in this manner the paint has a softer quality than the paint processed for the longer stirred period.

It has been observed that, with an alkali-metal hydroxide, e.g., potassium hydroxide, being added as a separate ingredient to the paint composition, the paint is well suited for use on a substrate subject to conditions of stress, e.g., flexure. Sample II is such a paint composition with the limits of the ingredients being specified and the potassium hydroxide being a 27 normal solution (27 N).

Sample II

| Ingredients: | Range (percent by weight) |
|---|---|
| Potassium silicate solution | 71–89 |
| Aluminum oxide powder (particle size of 0.3 to 2.0 microns) | 10–25 |
| Potassium hydroxide (27 N) | 1–4 |

Example II is a paint made within the limits specified in Sample II.

Example II

| Ingredients: | Range (percent by weight) |
|---|---|
| Potassium silicate solution (35 percent solids) | 79.4 |
| Aluminum oxide powder (0.3 microns particle size) | 18.4 |
| Potassium hydroxide (27 N) | 2.2 |

The paint composition listed in either Sample II or Example II is processed by the ingredients being stirred together in a container for 2 to 16 hours. It can be observed that the addition of potassium hydroxide, in addition to making the coating more flexible, also accelerates the process itself. As mentioned above in connection with Sample I, the stirring period can be reduced to 15 to 45 minutes by the ingredients being heated to a temperature of between 150 to 220 degrees Fahrenheit.

By adding boric acid to the paint composition, adhesion of the paint to a substrate can be enhanced and, at the same time, hardness of the paint can be increased. This is particularly true when the processing includes heating. Sample III is an example of such a coating with the limits of the ingredients being specified.

Sample III

| Ingredients: | Range (percent by weight) |
|---|---|
| Potassium silicate solution | 40–74 |
| Aluminum oxide powder (particle size of 0.3 to 2.0 microns) | 10–28 |
| Boric acid solution | 5–43 |
| Potassium hydroxide | 0–3 |

Example III is a paint composition within the limits specified in Sample III.

Example III

| Ingredients: | Percent by weight |
|---|---|
| Potassium silicate solution (35 percent solids) | 61.7 |
| Aluminum oxide powder (0.3 micron particle size) | 24.7 |
| Boric acid (3 percent solution) | 12.3 |
| Potassium hydroxide (27 N) | 1.3 |

The ingredients of either Sample III or Example III are stirred together at ambient conditions for 1 to 16 hours to form the paint composition.

Should it be desirable to produce a paint having extreme hardness and better adhesion to the substrate, then, an increase in the amount of boric acid, above that previously recited, is necessary and the process should be modified in the following manner. The boric acid and potassium hydroxide solutions are mixed in a container with 50 percent of the required aluminum oxide powder and about 20 percent of the required potassium silicate solution. These ingredients are simultaneously stirred and heated to between 150 and 220 degrees Fahrenheit until the resultant weight of the combined ingredients have decreased by approximately 50 percent due to the evaporation of a portion of the water thereof. The contents of the container are then cooled to room temperature, after which time, the remainder of the aluminum oxide and potassium silicate are stirred into the mixture. The total composition is then stirred for 30 minutes to 3 hours depending upon the surface texture the paint is to have. Example III' is a composition processed in this manner.

Example III'

| Ingredients: | Percent by weight |
|---|---|
| Potassium silicate solution | 41.3 |
| Aluminum oxide powder (0.3 micron particle size) | 16.6 |
| Boric acid solution (3 percent solution) | 41.3 |
| Potassium hydroxide (27 N) | 0.8 |

It has been found that the addition of zinc oxide to the composition increases the mar resistance of the paint. Sample IV is an example of such a paint with the limits of the ingredients being specified.

Sample IV

| Ingredients | Range (percent by weight) |
|---|---|
| Potassium silicate solution | 40–74 |
| Aluminum oxide powder (particle size of 0.3 to 2 microns) | 10–28 |
| Boric acid | 5–43 |
| Zinc oxide | 2–10 |
| Potassium hydroxide | 0–3 |

Example IV is a paint composition within the limits specified in Sample IV.

Example IV

| Ingredients | Percent by weight |
|---|---|
| Potassium silicate (35 percent solids) | 58.1 |
| Aluminum oxide powder (1 micron particle size) | 23.3 |
| Boric acid (3 percent solution) | 11.6 |
| Zinc oxide | 5.8 |
| Potassium hydroxide | 1.2 |

The ingredients of either Sample IV or Example IV are combined in a container under constant stirring. To the alkali-metal silicate, e.g., potassium silicate, the boric acid solution is slowly added to prevent the formation of precipitates. The potassium hydroxide solution, alluminum oxide and zinc oxide are added in the order recited. The resultant mixture is then continuously stirred from 1 to 10 hours depending upon the surface texture that is desired of the paint.

While the invention has been described thus far with reference to potassium silicate being the alkali-metal silicate vehicle, this is not to be construed as limiting since the various other alkali-metal silicates such as sodium silicate, lithum silicate, etc. or a mixture of such silicates, can be employed as the vehicle of the coating composition. For example, a paint sample, Sample V, using sodium silicate as a vehicle is as follows.

Sample V

| Ingredients | Range (percent by weight) |
|---|---|
| Sodium silicate solution | 72–90 |
| Aluminum oxide powder (particle size of 0.3 to 2 microns) | 10–28 |

Example V is a particular paint composition comprising the ingredients listed in Sample V within the limits specified.

Example V

| Ingredients | Percent by weight |
|---|---|
| Sodium silicate solution (50 percent solids) | 75 |
| Aluminum oxide powder (0.3 microns particle size) | 25 |

It is important to note that the ingredients used in processing the various paints enumerated hereinabove were those commercially available and were not manufactured exclusively for the purpose or use nor in accordance with any particular specification relating to the intended use. In addition, while the samples were processed with a given concentration of potassium silicate solution, this is not a limiting factor because water, as a separate ingredient, can be added or deleted in accordance with the solid content of the potassium silicate.

SUMMARY

To provide one with a better understanding of the invention, a detailed description is now presented of a preferred embodiment of the paint composition and the processing thereof, particularly where the composition is used for controlling the temperature of satellites and/or space vehicles.

Paint composition

| Ingredients: | Weight in grams |
|---|---|
| Potassium silicate solution (35 percent solids) | 100 |
| Aluminum oxide power (1 micron) | 40 |
| Boric acid (3 percent solution) | 20 |
| Potassium hydroxide (27 N) | 2 |
| Total | 162 |

Process

The 20 grams of boric acid solution are stirred into the 100 grams of potassium silicate solution. Thereafter, the 40 grams of aluminum oxide and the 2 grams of potassium hydroxide are added. The total composition is then stirred for approximately 90 minutes.

Whereas the primary use of the instant invention is for painting satellites, it can be used as a general purpose paint because it performs well when applied directly to substrates of aluminum, steel, plastics, cement products, ceramics, cellulose materials, etc. In applying the paint to the various substrates, the techniques relating to surface treating, priming, curing and sealing described in detail in co-pending patent application, Serial No. 452,945 filed May 3, 1965 (NASA Case No. 4119), entitled, "Alkali-Metal Silicate Protective Coatings," by the instant inventors can be used when appropriate.

It has been observed that the paint has the characteristics of being durable and color-fast during extreme variations in temperature, starting at −320 degrees Fahrenheit and up to at least 1800 degrees Fahrenheit. The paint exhibits no yellowing at higher temperatures, as is characterized by many prior art white paints. For this reason it is considered that the instant paint will be applicable for coating solar probes.

Although the foregoing disclosure relates to preferred embodiments of the invention, it is obvious that numerous modifications and alterations may be made without departing from the spirit and scope of the invention set forth in the appended claims.

What is claimed is:

1. A paint composition consisting essentially of an alkali-metal silicate solution of 72 to 90 percent by weight and powdered aluminum oxide of particle size from 0.3 to 2 microns and of 10 to 28 percent by weight.

2. A paint composition consisting essentially of an alkali-metal silicate solution of 71 to 89 percent by weight, aluminum oxide of 10 to 25 percent by weight and particle size of 0.3 to 2 microns, and alkali-metal hydroxide solution of 1 to 4 percent by weight.

3. A paint composition consisting essentially of a boric acid solution of 5 to 43 percent by weight, alkali-metal silicate solution of 40 to 74 percent by weight, aluminum oxide of 10 to 28 percent by weight and particle size of 0.3 to 2 microns, and alkali-metal hydroxide of up to 3 percent by weight.

4. A paint composition consisting essentially of potassium silicate solution of 40 to 70 percent by weight; powdered aluminum oxide of 0.3 to 2 microns particle size and of 10 to 20 percent by weight; potassium hydroxide solution of up to 3 percent by weight; boric acid solution of 5 to 43 percent by weight; and zinc oxide of 2 to 10 percent by weight.

5. A method of processing a paint composition comprising the steps of: combining an alkali-metal silicate water solution of 72 to 90 percent by weight with aluminum oxide of particle size of 0.3 to 2 microns and of 10 to 28 percent by weight to form a mixture; and stirring said mixture from 5 to 48 hours depending upon the desired texture of the paint.

6. A method of processing a paint composition comprising the steps of: combining an alkali-metal silicate water solution of 72 to 90 percent by weight with aluminum oxide of particle size of 0.3 to 2 microns and of 10 to 28 percent by weight; and simultaneously stirring and heating to a temperature of 150 to 220 degrees Fahrenheit for 15 to 45 minutes.

7. A method of processing a paint composition comprising the steps of: combining alkali-metal silicate solution of 71 to 89 percent by weight, aluminum oxide of particle size of 0.3 to 3 microns and of 10 to 25 percent by weight, and alkali-metal hydroxide solution of 1 to 4 percent by weight to form a mixture; and stirring said mixture for 2 to 16 hours.

8. A method of processing a paint composition comprising the steps of: combining an alkali-metal silicate solution of 40 to 74 percent weight, aluminum oxide of particle size of 0.3 to 2 microns and of 10 to 28 percent by weight, boric acid solution of 5 to 43 percent by weight, and alkali-metal hydroxide of up to 3 percent by weight to form a mixture; and stirring said mixture for 1 to 16 hours.

9. A method of processing a paint composition comprising the steps of: slowly adding boric acid solution of 5 to 43 percent by weight to alkali-metal silicate water solution of 40 to 74 percent by weight; adding thereto alkali-metal hydroxide solution of up to 3 percent by weight, aluminum oxide of particle size of 0.3 to 2 microns and of 10 to 28 percent by weight; and zinc oxide of 2 to 10 percent by weight, in the order recited, to form a mixture; and continuously stirring said mixture from 1 to 10 hours.

10. A method of processing a paint composition comprising the steps of: stirring boric acid solution of 5 to 43 percent by weight into potassium silicate solution of 35 percent solids and 40 to 74 percent by weight; adding thereto aluminum oxide of particle size of 0.3 to 2 microns and 10 to 28 percent by weight and potassium hydroxide solution of up to 3 percent by weight to form a mixture; and stirring said mixture for approximately 90 minutes.

References Cited

UNITED STATES PATENTS

| 3,130,061 | 4/1964 | McMahon et al. | 106—84 |
| 3,180,746 | 4/1965 | Patton et al. | 106—84 |
| 3,222,197 | 12/1965 | Sibert et al. | 106—84 |
| 3,301,702 | 1/1967 | Ames et al. | 106—84 |

JAMES E. POER, *Primary Examiner.*